US012746914B2

(12) United States Patent
Kim

(10) Patent No.: US 12,746,914 B2
(45) Date of Patent: Sep. 29, 2026

(54) METHOD AND APPARATUS FOR COLLISION AVOIDANCE OR IMPACT FORCE REDUCTION

(71) Applicant: HYUNDAI MOBIS CO., LTD., Seoul (KR)

(72) Inventor: Kang Hee Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 228 days.

(21) Appl. No.: 18/382,548

(22) Filed: Oct. 23, 2023

(65) Prior Publication Data

US 2024/0278776 A1 Aug. 22, 2024

(30) Foreign Application Priority Data

Feb. 9, 2023 (KR) ........................ 10-2023-0017249

(51) Int. Cl.

| | |
|---|---|
| ***B60W 30/09*** | (2012.01) |
| ***B60W 10/04*** | (2006.01) |
| ***B60W 10/18*** | (2012.01) |
| ***B60W 10/20*** | (2006.01) |

(52) U.S. Cl.

CPC ............ *B60W 30/09* (2013.01); *B60W 10/04* (2013.01); *B60W 10/18* (2013.01); *B60W 10/20* (2013.01); *B60W 2520/14* (2013.01); *B60W 2710/18* (2013.01); *B60W 2710/20* (2013.01); *B60W 2720/106* (2013.01)

(58) Field of Classification Search

CPC ...... B60W 30/09; B60W 10/04; B60W 10/18; B60W 10/20; B60W 2520/14; B60W 2710/18; B60W 2710/20; B60W 2720/106; B60W 2554/40; B60W 50/14; B60W 30/08; B60W 2030/082; B60W 2554/404; B60W 2556/45; B60W 2710/182; B60W 2710/207; B60W 30/0956; B60W 2420/00; B60W 40/114; B60R 21/013; B60Y 2300/097

See application file for complete search history.

(56) References Cited

U.S. PATENT DOCUMENTS

| | | | | |
|---|---|---|---|---|
| 12,240,443 | B2 * | 3/2025 | Hashimoto | B60W 60/0015 |
| 2011/0054741 | A1 | 3/2011 | Stabrey | |
| 2011/0196579 | A1 * | 8/2011 | Tokimasa | B60W 30/09 701/48 |
| 2018/0099677 | A1 * | 4/2018 | Sugai | B60L 15/20 |
| 2019/0315345 | A1 * | 10/2019 | Newman | B60W 50/14 |

(Continued)

FOREIGN PATENT DOCUMENTS

KR 10-2268640 B1 6/2021

OTHER PUBLICATIONS

Extended European Search Report issued Apr. 8, 2024 for European Patent Application No. 23206145.7.

*Primary Examiner* — Aniss Chad
*Assistant Examiner* — Nikki Marie M Molina
(74) *Attorney, Agent, or Firm* — Morgan Lewis & Bockius LLP

(57) ABSTRACT

Disclosed herein is a vehicle control method for collision avoidance or impact force reduction. The method may include: initiating steering control, differential braking control, or differential acceleration control of a subject vehicle depending on a yaw rate value after a collision with a following vehicle; and stopping the control depending on the yaw rate value after execution of the control.

9 Claims, 7 Drawing Sheets

(56) References Cited

U.S. PATENT DOCUMENTS

| | | | | |
|---|---|---|---|---|
| 2019/0391582 | A1* | 12/2019 | Jung | B60Q 1/525 |
| 2022/0185263 | A1* | 6/2022 | Akiyama | B62D 6/10 |
| 2023/0122952 | A1* | 4/2023 | Labarbera | B60T 7/12<br>701/70 |

* cited by examiner

METHOD AND APPARATUS FOR COLLISION AVOIDANCE OR IMPACT FORCE REDUCTION

Pursuant to 35 U.S.C. § 119(a), this application claims the benefit of Korean Patent Application No. 10-2023-0017249, filed on Feb. 9, 2023, which is hereby incorporated by reference as if fully set forth herein.

BACKGROUND

Technical Field

The present disclosure relates to vehicles, and more particularly, to a method and apparatus for collision avoidance or impact force reduction.

Discussion of the Related Art

Safety related to vehicles is becoming increasingly important over time, and features that assist in ensuring safety are becoming a crucial decision factor in purchasing a vehicle.

As a feature related to vehicle safety, an automatic emergency braking function is being considered to prevent vehicle collisions. Korean Patent No. 2268640 discloses the content thereof, which pertains to a system in which a subject vehicle positioned at the rearmost calculates the following collision risk levels: 1) a collision risk level between the subject vehicle and a preceding vehicle; 2) a collision risk level between two preceding vehicles in front of the subject vehicle; and 3) a collision risk level between the subject vehicle and a following vehicle behind the subject vehicle. Subsequently, the subject vehicle dynamically adjusts the timing of alerts and the timing of braking for chain collision avoidance by comparing each collision risk level with a reference collision risk level. Then, the subject vehicle provides alerts and applies braking. That is, the system is designed to prevent chain collision accidents during high-speed driving.

The present disclosure aims to propose safety features to prevent rear-end chain collisions and mitigate the impact force during collisions.

PRIOR ART DOCUMENTS

Patent Documents

Korean Patent No. 10-2268640

SUMMARY

Accordingly, the present disclosure is directed to a method and apparatus for collision avoidance or impact force reduction that substantially obviates one or more problems due to limitations and disadvantages of the related art.

Based on the background described above, the present disclosure aims to provide a vehicle control method for avoiding collisions with following vehicles or reducing the impact force in the event of a collision.

The present disclosure aims to provide a vehicle control method for preventing secondary collisions even in the event of a collision with a following vehicle.

It will be appreciated by persons skilled in the art that the objects that could be achieved with the present disclosure are not limited to what has been particularly described hereinabove and other objects will be more clearly understood from the following detailed description.

To achieve these objects and other advantages and in accordance with the purpose of the disclosure, as embodied and broadly described herein, there is provided a vehicle control method for collision avoidance or impact force reduction. The method may include: initiating steering control, differential braking control, or differential acceleration control of a subject vehicle depending on a sensed yaw rate value after a collision with a following vehicle behind the subject vehicle; and stopping the control depending on the sensed yaw rate value after execution of the control.

In another aspect of the present disclosure, there is provided a vehicle control apparatus for collision avoidance or impact force reduction. The apparatus may include: a sensor configured to sense a yaw rate and detect a collision with a following vehicle behind the subject vehicle; and a controller configured to: initiate steering control, differential braking control, or differential acceleration control of a subject vehicle depending on a sensed yaw rate value after the collision with the following vehicle; and stop the control depending on the sensed yaw rate value after execution of the control.

It is apparent that the above-described aspects of the present disclosure are merely part of the embodiments of the present disclosure. Thus, various modifications and alternatives could be derived from the following detailed description of the present disclosure.

According to the present disclosure, collision avoidance or impact force reduction during collisions may be achieved.

In addition, it is possible to prevent secondary collisions with other vehicles after an initial collision with a following vehicle.

The effects that are achievable by the present disclosure are not limited to what has been particularly described hereinabove and other advantages not described herein will be more clearly understood by persons skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
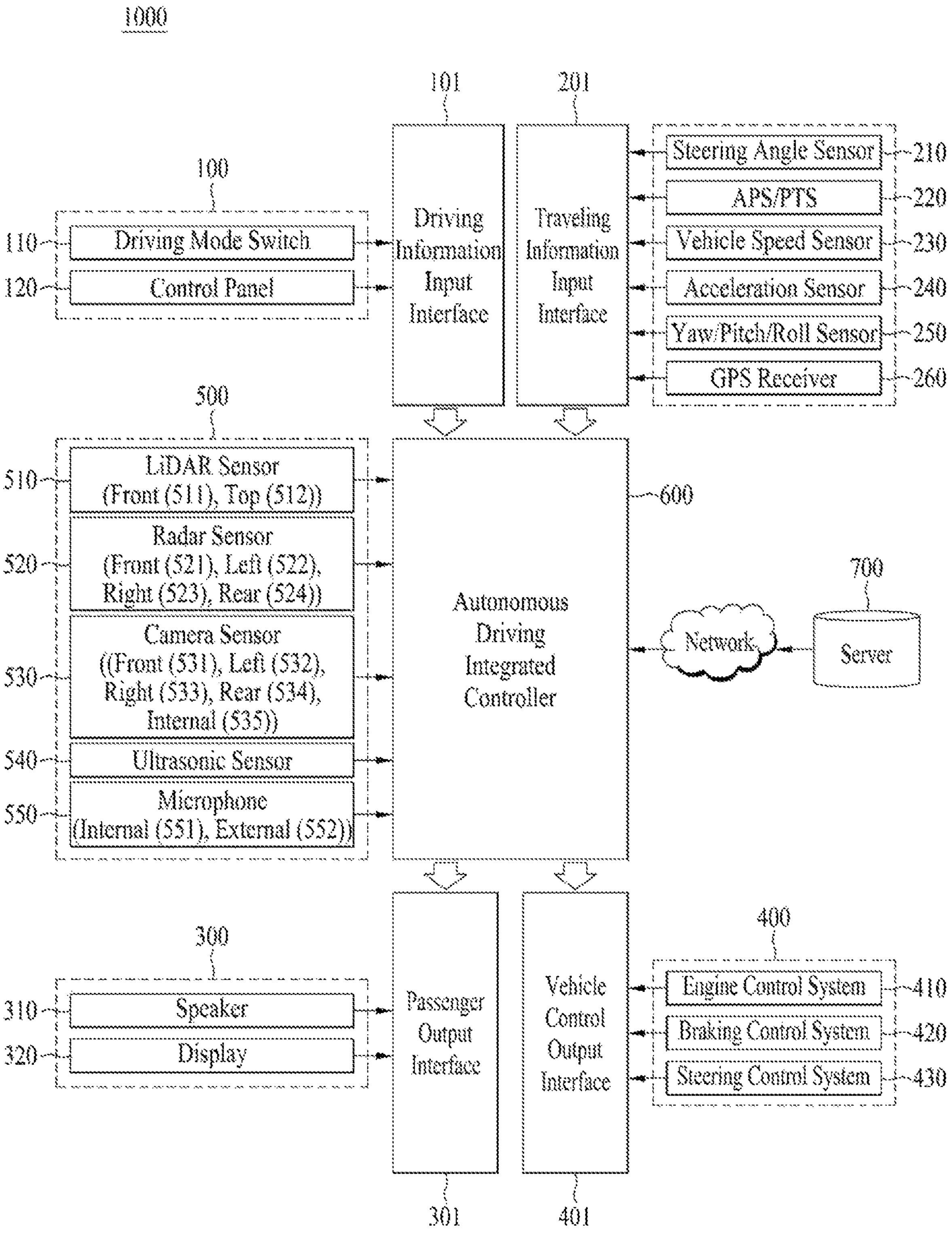
FIG. 1 is an overall block diagram of an autonomous driving vehicle to which an autonomous driving device is applicable.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

Figure 2:
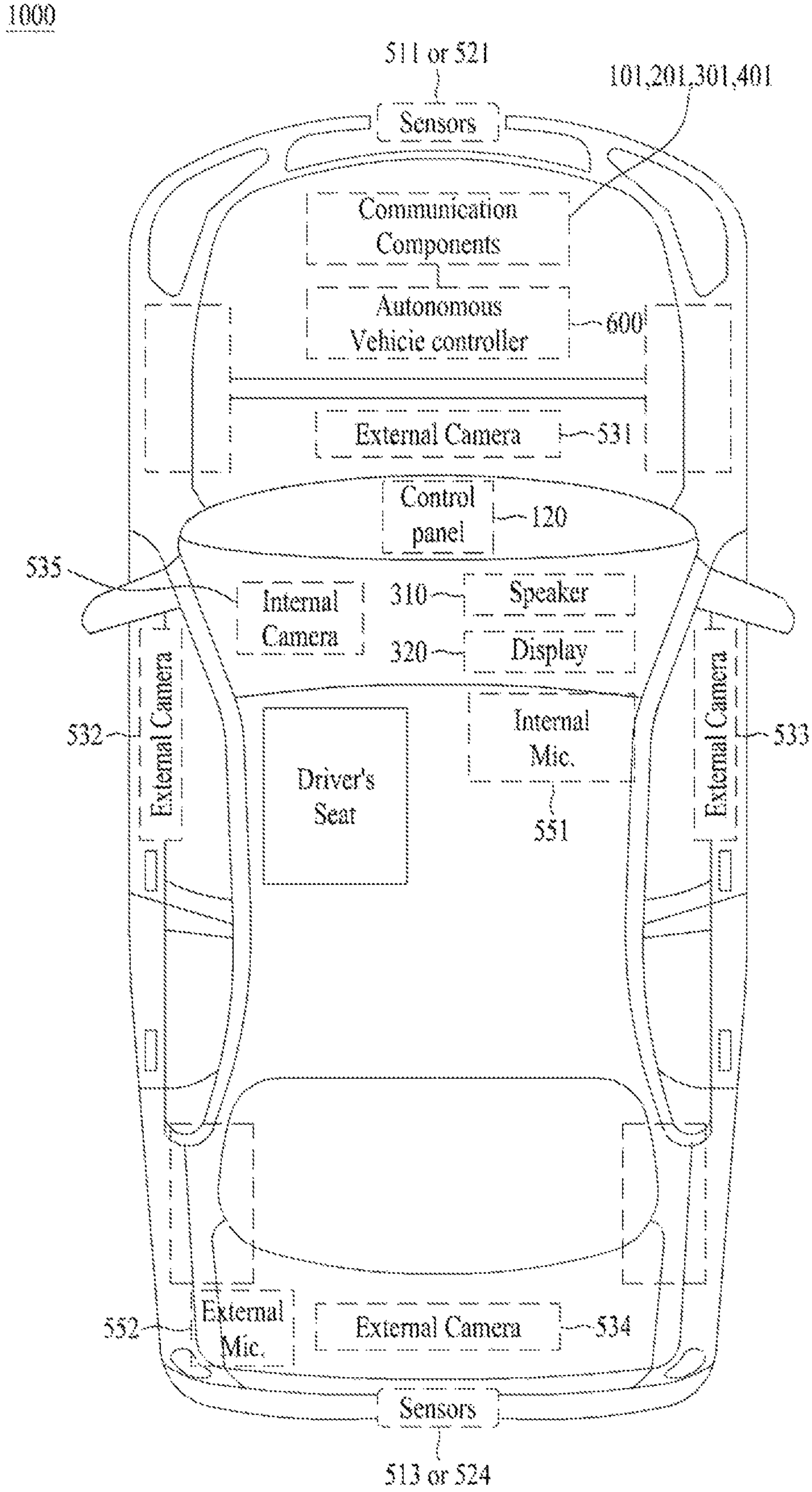
FIG. 2 is a diagram illustrating an example in which an autonomous driving device is applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

In this document, a vehicle control method for preventing rear-end collisions will be described. In addition to the vehicle control method for preventing rear-end collisions, a vehicle control method for mitigating the impact force during rear-end collisions will be described as well.

The proposed technology aims not only to prevent rear-end collision accidents that are difficult for drivers to respond to but also to enhance driver survival rates or reduce the extent of injuries through impact mitigation control when avoiding accidents becomes impossible.

The proposed technology may be broadly categorized into providing warnings for rear-end collisions in advance and mitigating the impact force during rear-end collisions.

Figure 3:
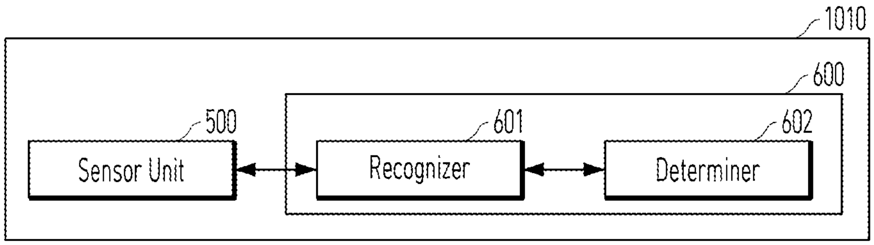
FIG. 3 is a block diagram of a vehicle control device.

FIG. 3 illustrates a vehicle control device 1010 according to the present disclosure.

The sensor unit 500 may include the radar sensor 520 or the ultrasonic sensor 540. The sensor unit 500 may detect forward and following vehicles of a subject vehicle and detect the distance, relative velocity, and acceleration between the subject vehicle and the forward or following vehicle. The types of sensors are not limited to the radar sensor 520 or the ultrasonic sensor 540. In addition, the sensor unit 500 may detect collisions with the forward or following vehicle.

The controller 600 includes a recognizer 601 and a determiner 602. The recognizer 601 may determine the presence or absence of a forward or following vehicle and calculate the position, velocity, acceleration, etc. of the forward or following vehicle, based on sensor values detected by the sensor unit 500. In addition, the recognizer 601 may predict the travel path of the forward or following vehicle and compute the distance, relative velocity, and relative acceleration between the subject vehicle and the forward or following vehicle. The determiner 602 may assess a potential collision with the forward or following vehicle based on the results computed by the recognizer 601. In addition, the determiner 602 may calculate a time to collision (TTC) (i.e., expected collision time) or an enhanced TTC (ETTC) with the following vehicle. Furthermore, the determiner 602 may calculate vehicle acceleration, deceleration, or steering control values necessary for collision avoidance or impact force reduction during collisions.

The controller 600 may control the sensor unit 500, recognizer 601, or determiner 602. In addition, the controller 600 may perform vehicle control such as acceleration/deceleration and steering using the output of the sensor unit 500, recognizer 601, or determiner 602, such as sensor values or calculation results.

The recognizer 601 and determiner 602 are described as separate components in FIG. 3, but the recognizer 601 and determiner 602 may be integrated into the controller 600.

The vehicle control device 1010 is installed in the subject vehicle 1000 and performs the proposed vehicle control. However, for the sake of simplicity in the following descriptions, the subject vehicle 1000 is described as the entity that executes the proposed vehicle control.

Figure 4:
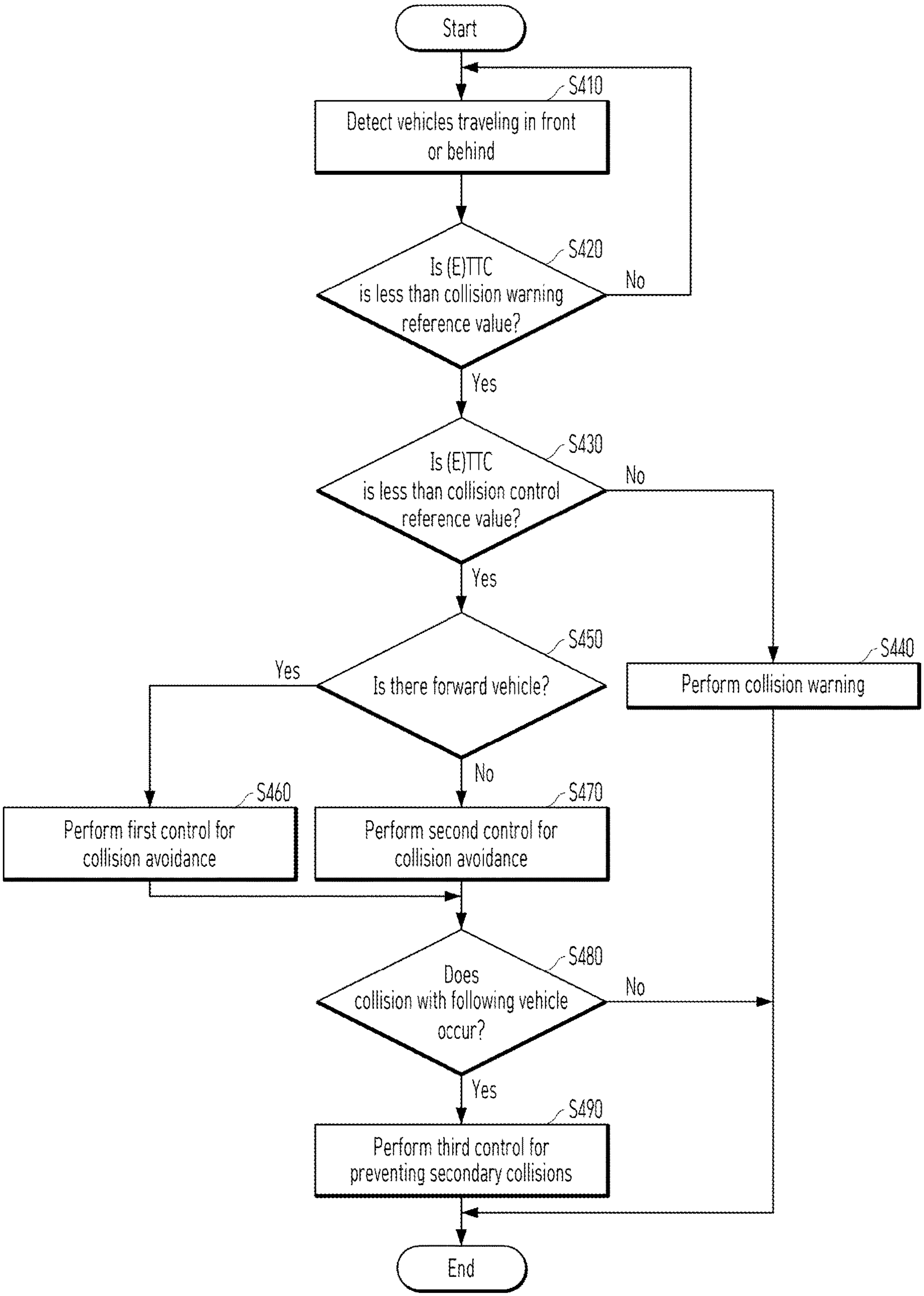
FIG. 4 is a flowchart of a vehicle control method.

FIG. 4 illustrates a flowchart of a vehicle control method according to the present disclosure.

The subject vehicle 1000 may detect vehicle(s) traveling in front or behind (S410). When driving on a multi-lane road, the subject vehicle 1000 may detect not only forward or following vehicles located in the same lane but forward or following vehicles located in neighboring lanes.

The subject vehicle 1000 may compare the TTC or ETTC (hereinafter referred to as "expected collision time") for a following vehicle with a predetermined collision warning reference value (S420). If the expected collision time is greater than the collision warning reference value, the subject vehicle 1000 may return to the initial process of detecting forward or following vehicles. If the expected collision time is less than the collision warning reference value, the subject vehicle 1000 may compare the expected collision time for the following vehicle with a predetermined collision control reference value (S430).

If the expected collision time is greater than the collision control reference value, the subject vehicle 1000 may perform a collision warning (S440). The collision warning includes outputting a warning sound or a warning message through the speaker 310 or display 320 of the subject vehicle 1000. Additionally, the collision warning may include auditory signals such as the horn or visual signals such as flashing the brakes on the subject vehicle 1000 to enable the driver of a following vehicle 3000 to perceive the possibility of a collision.

If the expected collision time is less than the collision control reference value, the subject vehicle 1000 may perform vehicle control depending on the presence of a forward vehicle in front of the subject vehicle (S450).

If there is a forward vehicle, the subject vehicle 1000 may execute first control for collision avoidance or impact force reduction (S460). The first control may include acceleration control of the subject vehicle 1000. Further details regarding the first control will be described with reference to FIG. 5.

If there is no forward vehicle, the subject vehicle 1000 may execute second control for collision avoidance or impact force reduction (S470). The second control may include acceleration control of the subject vehicle 1000. Further details regarding the second control will be described with reference to FIG. 6.

After executing the first control or second control, the subject vehicle 1000 may determine whether a collision occurs with the following vehicle (S480). If the subject vehicle 1000 collides with the following vehicle, the subject vehicle 1000 may perform third control for preventing secondary collisions (S490). Further details regarding the third control will be described with reference to FIGS. 7 to 11. In FIGS. 5 to 11, the left side of each vehicle (vehicles 1000, 2000, and 3000) corresponds to the front side of the vehicle.

Figure 5:
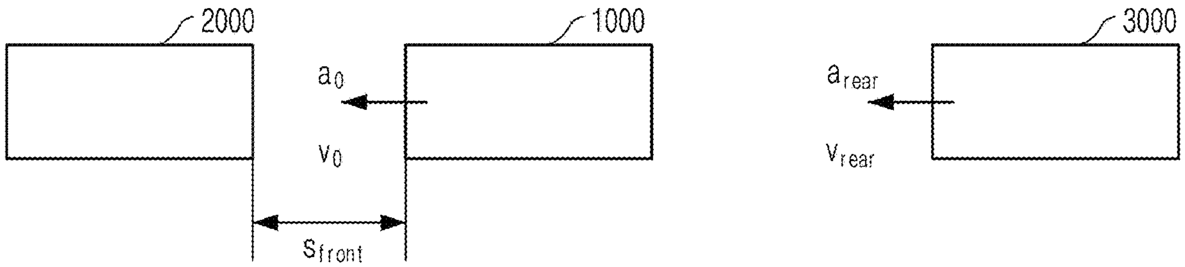
FIG. 5 is a diagram for explaining first control.

FIG. 5 is a diagram for explaining the first control.

In FIG. 5, the subject vehicle 1000 is traveling between the forward vehicle 2000 and the following vehicle 3000. It is assumed that the expected collision time is less than the collision control reference value and the forward vehicle 2000 is present as described above in FIG. 4.

In FIG. 5, $a_o$ and $v_o$ denote the acceleration and velocity of the subject vehicle 1000, respectively, $s_{front}$ denotes the distance between the subject vehicle 1000 and the forward vehicle 2000, and $a_{rear}$ and $v_{rear}$ denote the acceleration and velocity of the following vehicle 3000, respectively.

To prevent a collision with the following vehicle 3000 or reduce the impact force with the following vehicle 3000, it may be most desirable to control the acceleration of the subject vehicle 1000. However, as shown in FIG. 5, when the forward vehicle 2000 is present, controlling the acceleration of the subject vehicle 1000 may cause a collision with the forward vehicle 2000. Therefore, it is necessary to adjust the timing of acceleration control, unlike a case where there is no forward vehicle. The distance between the subject vehicle 1000 and forward vehicle 2000 may be expressed as follows:

$$s_{front} = \frac{1}{2}aT_{calc}^2, (a = G_{target}).$$

In the above equation, $G_{target}$ denotes the target acceleration of the subject vehicle 1000. $T_{calc}$ denotes the expected collision time between the subject vehicle 1000 and the forward vehicle 2000.

Assuming that $T_{collision}$ is a reference value (timing) for acceleration control when there is no forward vehicle, a reference value (timing) ($T_{crash\_with\_frontOBJ}$) for acceleration control when there is a forward vehicle may be expressed as follows.

$$T_{crash\_with\_frontOBJ} = \min(T_{calc}, T_{collision})$$

For example, when $T_{collision}$ and $T_{calc}$ are calculated as follows: $T_{collision}$=3 (seconds) and $T_{calc}$=2 (seconds), the timing of controlling the acceleration of the subject vehicle 1000 is 2 (seconds), which means that the acceleration control of the subject vehicle 1000 is performed at the moment when the expected collision time becomes two seconds. In other words, compared to a case where there is no forward vehicle, the timing of acceleration control is delayed by one second.

Selecting the minimum value between the expected collision time ($T_{calc}$) for the forward vehicle 2000 and the reference value ($T_{collision}$) for acceleration control is meaningful when the subject vehicle 1000 and the forward vehicle 2000 are within a predetermined distance at the time of acceleration control. The reason for this is that the target acceleration of the subject vehicle 1000 depends on vehicle performance and is subject to certain constraints. Therefore, if the subject vehicle 1000 and the forward vehicle 2000 are relatively far apart, $T_{calc}$ is expected to be greater than the reference value ($T_{collision}$) for acceleration control. Consequently, the reference value ($T_{crash\_with\_frontOBJ}$) for acceleration control when there is a forward vehicle may be selected as the reference value ($T_{collision}$) for acceleration control. In other words, when the distance between the forward vehicle 2000 and the subject vehicle 1000 is greater than the predetermined distance at the time of acceleration control, even if the forward vehicle 2000 is present, the timing of acceleration control may be determined to be the same when there is no forward vehicle. This is consistent with the second control, which will be described.

Furthermore, control to warn or avoid a collision with the forward vehicle 2000 may be performed based on the driving assistance features of the subject vehicle 1000. However, this will not be discussed in this specification.

Figure 6:
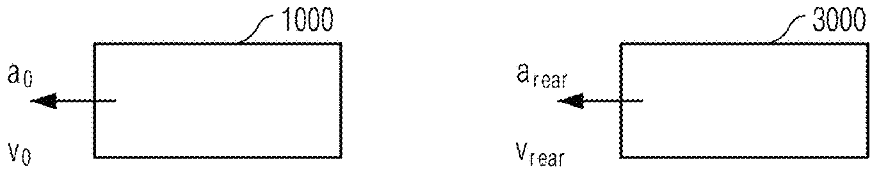
FIG. 6 is a diagram for explaining second control.
Figure 7:
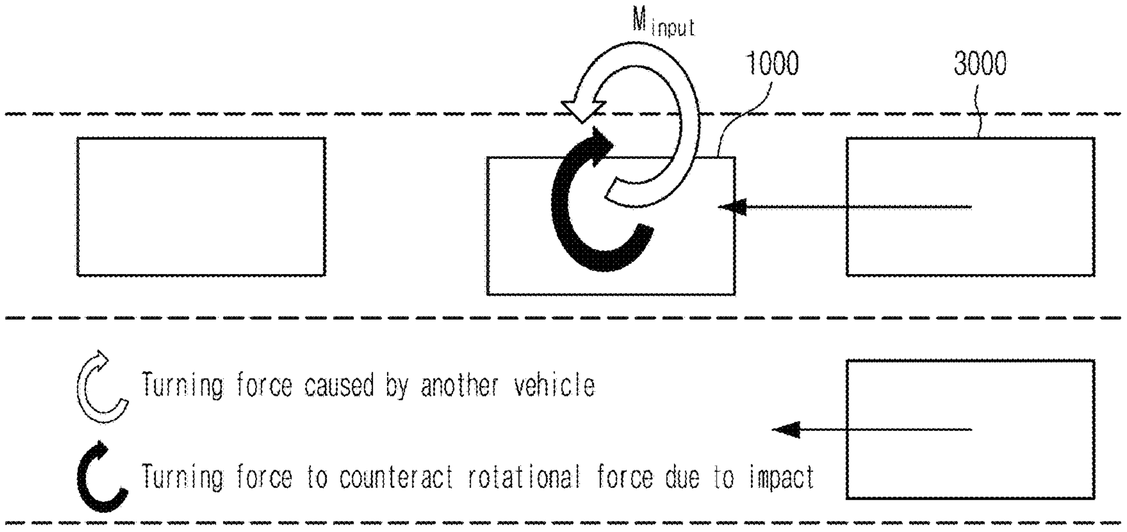
FIGS. 7 to 11 are diagrams for explaining third control.

FIG. 6 is a diagram for explaining the second control.

In FIG. 6, the subject vehicle 1000 is traveling before the following vehicle 3000. It is assumed that the expected collision time is less than the collision control reference value and there is no forward vehicle as described above in FIG. 4. The parameters shown in FIG. 6 are the same as the parameters of FIG. 5.

The subject vehicle 1000 may perform acceleration control based on a predetermined target acceleration ($G_{target}$). Assuming that the velocity of the following vehicle 3000 is constant, the change in relative velocity between the subject vehicle 1000 and following vehicle 3000 until the point of collision is $G_{target}$*T, where T denotes the time from the timing of acceleration control to the collision. Considering that the subject vehicle 1000 is configured to be controlled only when the expected collision time is less than the collision control reference value ($T_{collision}$), the following may be satisfied: T=expected collision time. Alternatively, the expected collision time and the collision control reference value ($T_{collision}$) may be considered almost the same. Regardless of whether T is set to the expected collision time or the collision control reference value, there may not be significant differences in the value of T.

The change in impact force is proportional to the change in velocity. For instance, it is assumed that the following vehicle 3000 is traveling at a speed of 100 kph and the subject vehicle 1000 is traveling at a speed of 70 kph. Assuming that $G_{target}$=2 m/s$^2$ because the maximum acceleration of a typical vehicle is about 4 m/s$^2$ and a collision occurs after the expected collision time (3 seconds), the change in impact force is calculated as follows: {100−(70+3*2*3.6)}/(100−70)*100=28%.

As an alternative or complementary function for the first or second control described above, the subject vehicle 1000 may execute the following control if the expected collision time is less than the collision control reference value.

The subject vehicle 1000 may transmit control signals in advance to the airbag system or seat headrest control system, thereby preventing airbag malfunction or enabling the occupants within the subject vehicle 1000 to protect their own bodies during collisions.

Furthermore, if the radar sensor 520 is mounted on the rear side of the subject vehicle 1000, the subject vehicle 1000 may transmit interference signals to the following vehicle 3000, thereby creating an environment where the following vehicle 3000 is capable of performing braking control as a driving assistance function such as emergency braking.

When the subject vehicle 1000 is capable of detecting surrounding vehicles on lanes adjacent to its travel lane (S410), the subject vehicle 1000 may perform the following control. When there is a safe space for lane change in an adjacent lane, the subject vehicle 1000 may perform lane change control. In this case, the subject vehicle 1000 may execute the lane change control in consideration of the position or direction of the following vehicle 3000.

FIGS. 7 to 11 are diagrams for explaining the third control. The third control is conducted under the assumption of a collision between the following vehicle 3000 and the subject vehicle 1000. Specifically, the collision with the following vehicle 3000 may result in a turning force ($M_{input}$) on the subject vehicle 1000. The turning force may cause abrupt turns of the subject vehicle 1000, leading to lane departure or even rollover. To prevent secondary collisions or accidents resulting therefrom, control for mitigating the turning force of the subject vehicle 1000, that is, the third control will be described.

In FIGS. 8 to 11, $P_{center}$ denotes the center of gravity of the subject vehicle 1000, $P_{rear\_center}$ denotes the center of gravity of the following vehicle 3000, $M_{center}$ denotes the weight of the following vehicle 3000, and $M_{input}$ denotes the turning force exerted by the following vehicle 3000 on the subject vehicle 1000.

Figure 8:
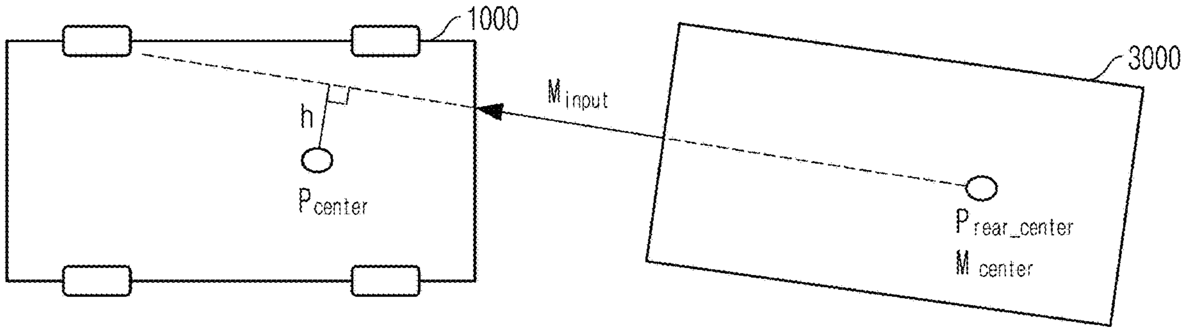

FIG. 8 illustrates that the following vehicle 3000 is travelling at a certain angle to the travelling direction of the subject vehicle 1000. However, even if the following vehicle 3000 is travelling in the same direction or parallel to the subject vehicle 1000, there may be a turning force. Thus, the proposed technique is not limited solely to the illustrated scenario.

Figure 9:
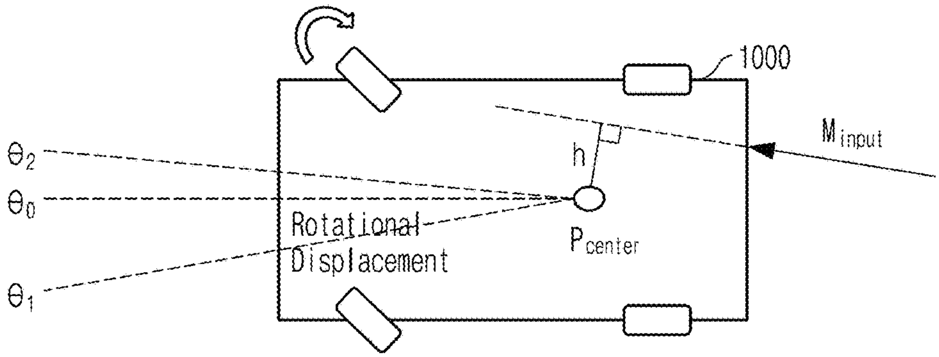

FIG. 9 is a diagram for explaining steering control of the subject vehicle 1000 due to the turning force. Referring to FIG. 9, the subject vehicle 1000 is oriented at an angle of $\theta_0$ before colliding with the following vehicle 3000. However, after the collision, the subject vehicle 1000 is oriented at an angle of $\theta_1$ due to the turning force. The steering control of the subject vehicle 1000 may be applied to enable the subject vehicle 1000 to keep the same travelling direction as before the collision as much as possible, that is, to allow the subject vehicle 1000 to maintain its lane.

The subject vehicle 1000 may be configured to store its orientation angle periodically or aperiodically, thereby enabling retrieval of the orientation angle before the collision. The amount of rotation of the subject vehicle 1000 due to the collision is computed by a yaw rate sensor, and the steering control controls the subject vehicle 1000 to recover the orientation angle immediately before the collision. To rapidly recover the orientation angle, the target orientation angle, that is, the orientation angle before the collision, may be set greater than the actual value by a predetermined offset. In this case, a steering angle may be calculated by analyzing the difference between the current orientation angle and the orientation angle before the collision.

Figure 10:
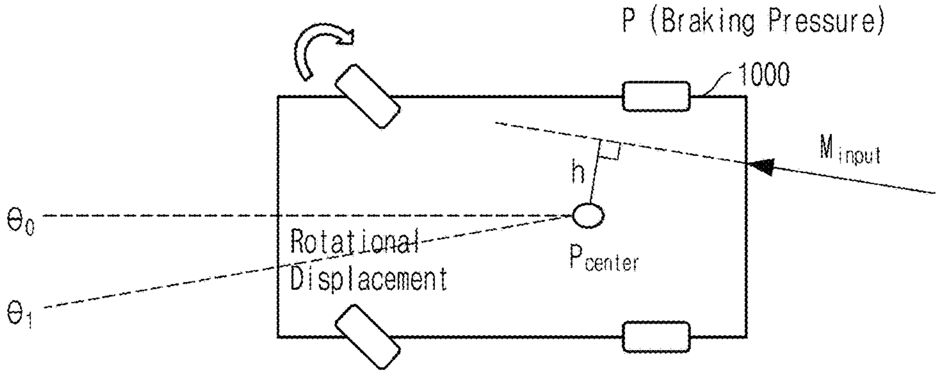

FIG. 10 is a diagram for explaining braking control of the subject vehicle 1000 due to the turning force. Referring to FIG. 10, the subject vehicle 1000 is oriented at an angle of $\theta_0$ before colliding with the following vehicle 3000. However, after the collision, the subject vehicle 1000 is oriented at an angle of $\theta_1$ due to the turning force. The braking control of the subject vehicle 1000 may be applied to enable the subject vehicle 1000 to keep the same travelling direction as before the collision as much as possible, that is, to allow the subject vehicle 1000 to maintain its lane. Similarly to how braking is used in the Electronic Stability Program (ESP) for vehicle attitude control, braking pressure is used as a means to regulate vehicle behaviors.

The braking control shown in FIG. 10 may be applied separately or independently. Alternatively, the braking control may be applied as an auxiliary means when the subject vehicle 1000 fails to restore its target orientation angle after performing the steering control shown in FIG. 9 or when there is no change in the rotation after performing the steering control. For example, even after executing the steering control shown in FIG. 9, the subject vehicle 1000 may perform the braking control in the following cases: when the yaw value or yaw rate value is close to zero (or if the yaw value or yaw rate value is less than a threshold), or when the direction of the yaw rate value is the same as the direction of the turning force.

In the state shown in FIG. 10, the subject vehicle 1000 rotates counterclockwise due to the turning force, and accordingly, to recover the orientation angle before the collision, the subject vehicle 1000 needs to rotate clockwise. Therefore, the braking control may apply a braking pressure only to the right rear wheel of the subject vehicle 1000. In other words, the braking control may be implemented as differential braking control capable of applying a braking pressure to any one of the multiple wheels of the vehicle.

The braking control of the subject vehicle 1000 may be terminated if the yaw rate value exceeds a predetermined threshold in a direction in which the subject vehicle 100 is controlled (i.e., the direction opposite to the turning force).

The braking pressure used for differential braking control may be selected from a set of predetermined values and applied. The braking pressure applied for the braking control may be proportional to the magnitude of the difference between the orientation angle before the collision and the current orientation angle of the subject vehicle 1000.

The braking control described above with reference to FIG. 10 may be expressed using conditional statements as follows:

$$-brakePressure =$$

$$\begin{matrix}\text{Braking pressure}\\\text{on right rear wheel}\end{matrix}(p_1 \text{ or } p_2 \text{ or } p_3)\big(\text{condition: if}(M_{input} < 0)$$

$$\text{and } ((\text{yaw} < \text{YAW}_{thre\_R}) \text{ or } (yawRate < \Delta\text{YAW}_{thre\_R})))$$

$$*(\Delta\text{YAW}_{thre\_R} > 0, \text{YAW}_{thre\_R} < 0)$$

$$\begin{matrix}\text{Breaking pressure}\\\text{on left rear wheel}\end{matrix}(p_1 \text{ or } p_2 \text{ or } p_3)\big(\text{condition:}$$

$$(\text{if } M_{input} > 0) \text{ and } ((\text{yaw} > \text{YAW}_{thre\_L}) \text{ or } (yawRate \geq \text{YAW}_{thre\_L}))\big)$$

$$*(\Delta\text{YAW}_{thre\_L} < 0, \text{YAW}_{thre\_L} > 0)$$

(Where $p_1$, $p_2$, and $p_3$ denote the amount of braking control. If the control amount is insufficient, braking pressure increase: $p_1<p_2<p_3$.).

Regarding the conditions for executing the above-described braking control, the yaw value and the yaw rate value are expressed by the condition "or". In other words, if either the yaw value or the yaw rate value satisfies the conditions, the braking control may be executed. However, for more exclusive vehicle control, the condition "and" may be used instead of using the condition "or", thereby configuring the braking control to be executed only when both conditions are satisfied.

Figure 11:
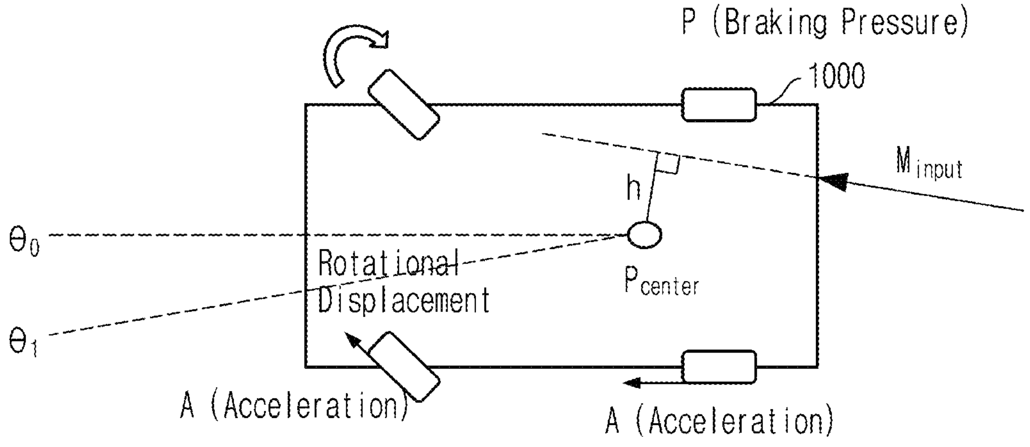

FIG. 11 is a diagram for explaining acceleration control of the subject vehicle 1000 due to the turning force. Referring to FIG. 11, the subject vehicle 1000 is oriented at an angle of $\theta_0$ before colliding with the following vehicle 3000. However, after the collision, the subject vehicle 1000 is oriented at an angle of $\theta_1$ due to the turning force. The acceleration control of the subject vehicle 1000 may be applied to enable the subject vehicle 1000 to keep the same travelling direction as before the collision as much as possible, that is, to allow the subject vehicle 1000 to maintain its lane.

The acceleration control shown in FIG. 11 may be applied separately or independently. Alternatively, the acceleration control may be applied as an auxiliary means when the subject vehicle 1000 fails to restore its target orientation angle after performing the control shown in FIGS. 9 and 10 or when there is no change in the rotation after performing the control. For example, even after executing the control shown in FIGS. 9 and 10, the subject vehicle 1000 may perform the acceleration control in the following cases: when the yaw value, the yaw rate value, or the variation in the yaw rate value is close to zero or when the direction of the yaw rate value is the same as the direction of the turning force.

In the state shown in FIG. 11, the subject vehicle 1000 rotates counterclockwise due to the turning force, and accordingly, to recover the orientation angle before the collision, the subject vehicle 1000 needs to rotate clockwise. Therefore, the acceleration control may be applied only to the left wheel of the subject vehicle 1000. In other words, the acceleration control may be implemented as differential acceleration control capable of applying power to any one of the multiple wheels of the vehicle.

The acceleration control of the subject vehicle 1000 may be terminated if the variation in the yaw rate value exceeds a predetermined threshold.

The acceleration used for differential acceleration control may be selected from a set of predetermined values and applied. The acceleration applied for the acceleration control may be proportional to the magnitude of the difference between the orientation angle before the collision and the current orientation angle of the subject vehicle 1000.

The acceleration control described above with reference to FIG. 11 may be expressed using conditional statements as follows:

$$-Accel = \begin{matrix}\text{Acceleration control}\\ \text{of left wheel}\end{matrix}(a_1 \text{ or } a_2 \text{ or } a_3)(\text{if } (M_{input} < 0)$$

$$\text{and } ((\mathrm{Yaw} < \mathrm{YAW}_{thre\_R}) \text{ and}$$

$$(yawRate \le \Delta\mathrm{YAW}_{thre\_R}) \text{ and } (\Delta(YAWRate) < \Delta\Delta\mathrm{YAW}_{thre\_R})))$$

$$*(\Delta\Delta\mathrm{YAW}_{thre\_R} > 0,\ \mathrm{YAW}_{thre\_R} < 0) =$$

$$\begin{matrix}\text{Acceleration control}\\ \text{of rear wheel}\end{matrix}(a_1 \text{ or } a_2 \text{ or } a_3), (\text{if } (M_{input} > 0)$$

$$\text{and } ((\mathrm{Yaw} > \mathrm{YAW}_{thre\_L}) \text{ and } (yawRate \ge \Delta\mathrm{YAW}_{thre\_L})$$

$$\text{and } (\Delta(YawRate) > \Delta\Delta\mathrm{Yaw}_{thre\_L})))$$

$$*(\Delta\Delta\mathrm{YAW}_{thre\_L} < 0,\ \mathrm{YAW}_{thre\_L} > 0)$$

(Where $a_1$, $a_2$, and $a_3$ denote the amount of acceleration control. If the amount of acceleration control is insufficient, acceleration increase: $a_1<a_2<a_3$.).

Regarding the conditions for executing the above-described acceleration control, the yaw value, the yaw rate value, and the variation in the yaw rate value are expressed by the condition "and". In other words, if all of the yaw value, the yaw rate value, and the variation in the yaw rate value satisfy the conditions, the acceleration control may be executed.

The steering, braking, or acceleration control may recover the target orientation angle more rapidly if the subject vehicle 1000 is capable of obtaining the driving information on the following vehicle 3000 or the vehicle state of the following vehicle 3000. In other words, if the driving information or vehicle state of the following vehicle 3000 is received through communication, the corresponding information may be used to configure a threshold for each of the yaw value, the yaw rate value, and the variation in the yaw rate value and select the braking pressure or acceleration.

Hereinabove, it has been described that the subject vehicle performs vehicle control, but the terms "subject vehicle" and components thereof are merely names, and thus, the scope of the present disclosure is not limited thereto.

In other words, the proposed technology may be implemented under other names rather than "vehicle" or "system." Furthermore, the methods or approaches described above may be carried out by software for vehicle control or code readable by computers, machines, devices, and so on.

In another aspect of the present disclosure, the operations of the proposed technology described above may be provided as code capable of being implemented, performed, or executed by a "computer" (as a comprehensive concept including a system-on-chip (SoC), a processor, a microprocessor, etc.), a computer-readable storage medium that stores or includes the code, a computer program product that stores or includes the code, and so on. Accordingly, the scope of the present disclosure may extend to the code, the computer-readable storage medium that stores or includes the code, or the computer program product that stores or includes the code.

The preferred embodiments of the present disclosure have been described in detail above to allow those skilled in the art to implement and practice the present disclosure.

Although the preferred embodiments of the present disclosure have been described above, those skilled in the art will appreciate that various modifications and variations could be made in the present disclosure without departing from the spirit or scope of the disclosure.

Thus, the present disclosure is not intended to be limited to the embodiments described herein but is intended to have the widest scope corresponding to the principles and novel features disclosed herein.

What is claimed is:

1. A vehicle control method, the method comprising:

sequentially initiating steering control, differential braking control, and differential acceleration control of a subject vehicle depending on a yaw rate value in response to a collision with a following vehicle behind the subject vehicle causing a turning force on the subject vehicle;

wherein the differential braking control is performed until the yaw rate value is more than or equal to a threshold in a direction in which the subject vehicle intends to be controlled after the steering control of the subject vehicle, wherein the differential acceleration control is performed until a variation in the yaw rate value is more than or equal to a threshold after the differential braking control of the subject vehicle, and wherein a steering angle of the steering control, a braking pressure of the differential braking control and an acceleration of the differential acceleration control is determined based on a difference between a current orientation angle and an orientation angle before the collision.

2. The method of claim 1, wherein the steering control, differential braking control, or differential acceleration control of the subject vehicle is based on driving information on the following vehicle.

3. The method of claim 1, further comprising, before the collision with the following vehicle behind the subject vehicle:

determining whether there is a forward vehicle in front of the subject vehicle in response that criteria for collision control to avoid the collision with the following vehicle are satisfied; and based on determining that the forward vehicle exists, controlling acceleration of the subject vehicle based on target acceleration of the subject vehicle based on that an expected collision time to collide with the following vehicle is less than or equal to a minimum value of a first time and a second time, wherein the first time is a collision control reference time to avoid the collision with the following vehicle, and wherein the second time is an expected collision time to collide with the forward vehicle.

4. The method of claim 1, comprising, before the collision with the following vehicle behind the subject vehicle:

determining whether there is a forward vehicle in front of the subject vehicle in response that criteria for collision control to avoid the collision with the following vehicle are satisfied; and based on determining that no forward vehicle exists, controlling acceleration of the subject vehicle based on target acceleration of the subject vehicle.

5. A non-transitory computer-readable medium having stored thereon a computer program, when executed by a processor, causing the processor to perform the method defined in claim 1.

6. A vehicle control apparatus, the apparatus comprising:

a sensor configured to sense a yaw rate value and detect a collision with a following vehicle behind a subject vehicle; and a controller configured to:

sequentially initiate steering control, differential braking control, and differential acceleration control of the subject vehicle depending on the yaw rate value in response to the collision with the following vehicle causing a turning force on the subject vehicle, wherein the differential braking control is performed until the yaw rate value is more than or equal to a threshold in a direction in which the subject vehicle intends to be controlled after the steering control of the subject vehicle, wherein the differential acceleration control is performed until a variation in the yaw rate value is more than or equal to a threshold after the differential braking control of the subject vehicle, and wherein a steering angle of the steering control, a braking pressure of the differential braking control and an acceleration of the differential acceleration control is determined based on a difference between a current orientation angle and an orientation angle before the collision.

7. The apparatus of claim 6, wherein the steering control, differential braking control, and differential acceleration control of the subject vehicle are based on driving information on the following vehicle.

8. The apparatus of claim 6, wherein the controller is configured to, before the collision with the following vehicle behind the subject vehicle:

determine whether there is a forward vehicle in front of the subject vehicle in response that criteria for collision control to avoid the collision with the following vehicle are satisfied; and based on determining that the forward vehicle exists, control acceleration of the subject vehicle based on target acceleration of the subject vehicle based on that an expected collision time to collide with the following vehicle is less than or equal to a minimum value of a first time and a second time, wherein the first time is a collision control reference time to avoid the collision with the following vehicle, and wherein the second time is an expected collision time to collide with the forward vehicle.

9. The apparatus of claim 6, wherein the controller is configured to, before the collision with the following vehicle behind the subject vehicle:

determine whether there is a forward vehicle in front of the subject vehicle in response that criteria for collision control to avoid the collision with the following vehicle are satisfied; and based on determining that no forward vehicle exists, control acceleration of the subject vehicle based on target acceleration of the subject vehicle.

* * * * *